US005741543A

United States Patent [19]
Winslow et al.

[11] Patent Number: 5,741,543
[45] Date of Patent: Apr. 21, 1998

[54] PROCESS FOR THE PRODUCTION OF AN ARTICLE COATED WITH A CROSSLINKED PRESSURE SENSITIVE ADHESIVE

[75] Inventors: Louis E. Winslow, Stillwater, Minn.; Greggory S. Bennett, Hudson, Wis.; Gaddam N. Babu, Woodbury, Minn.; Paul Hattam, Baldwin, Wis.; Michael L. Tumey, St. Paul; Bhaskar V. Velamakanni, Woodbury, both of Minn.

[73] Assignee: Minnesota Mining and Manufacturing Company, St. Paul, Minn.

[21] Appl. No.: 676,366

[22] PCT Filed: Feb. 9, 1996

[86] PCT No.: PCT/US96/01827

§ 371 Date: Jul. 18, 1996

§ 102(e) Date: Jul. 18, 1997

[87] PCT Pub. No.: WO96/24644

PCT Pub. Date: Aug. 15, 1996

Related U.S. Application Data

[63] Continuation-in-part of Ser. No. 386,890, Feb. 10, 1995, abandoned.

[51] Int. Cl.$^6$ ......................................................... B05D 5/10
[52] U.S. Cl. .................. 427/208.4; 428/345; 428/355; 526/317.1; 526/318.43; 526/318.44
[58] Field of Search .................. 427/208.4; 428/345; 428/355; 526/317.1, 318.43, 318.44

[56] References Cited

U.S. PATENT DOCUMENTS

| Re. 24,906 | 12/1960 | Ulrich | 206/59 |
|---|---|---|---|
| 3,615,972 | 10/1971 | Morehouse, Jr. et al. | 156/79 |
| 3,716,506 | 2/1973 | Simms et al. | 260/22 |
| 4,150,170 | 4/1979 | Lazear et al. | 427/54 |
| 4,181,752 | 1/1980 | Martens et al. | 427/54.1 |
| 4,223,067 | 9/1980 | Levens | 428/308 |
| 4,234,662 | 11/1980 | Pastor et al. | 428/500 |
| 4,243,500 | 1/1981 | Glennon | 204/159.12 |
| 4,329,384 | 5/1982 | Vesley et al. | 428/40 |
| 4,330,590 | 5/1982 | Vesley | 428/336 |
| 4,364,972 | 12/1982 | Moon | 427/54.1 |
| 4,379,201 | 4/1983 | Heilmann et al. | 428/345 |
| 4,391,687 | 7/1983 | Vesley | 204/159.16 |
| 4,415,615 | 11/1983 | Esmay et al. | 428/40 |
| 4,665,106 | 5/1987 | Ohta et al. | 522/49 |
| 4,710,536 | 12/1987 | Klingen et al. | 524/493 |
| 4,737,559 | 4/1988 | Kellen et al. | 526/291 |
| 4,749,590 | 6/1988 | Klingen et al. | 427/54.1 |
| 4,812,541 | 3/1989 | Mallya et al. | 526/264 |
| 4,818,610 | 4/1989 | Zimmerman et al. | 428/345 |
| 4,847,137 | 7/1989 | Kellen et al. | 428/195 |
| 4,894,259 | 1/1990 | Kuller | 427/208.8 |
| 4,895,738 | 1/1990 | Zimmerman et al. | 427/208.8 |
| 4,908,229 | 3/1990 | Kissel | 427/54.1 |
| 5,122,567 | 6/1992 | Spada et al. | 524/818 |
| 5,180,756 | 1/1993 | Rehmer et al. | 522/35 |
| 5,202,361 | 4/1993 | Zimmerman et al. | 522/120 |
| 5,274,063 | 12/1993 | Matsumoto et al. | 526/320 |
| 5,334,686 | 8/1994 | Ando et al. | 526/307.7 |
| 5,391,406 | 2/1995 | Ramharack et al. | 427/516 |
| 5,407,970 | 4/1995 | Peterson et al. | 522/33 |

FOREIGN PATENT DOCUMENTS

| 0 578 151 A1 | 7/1993 | European Pat. Off. |
| 0 615 983 A2 | 9/1994 | European Pat. Off. |
| 0620258 | 10/1994 | European Pat. Off. |
| 42 43 472 A1 | 6/1994 | Germany |
| 57-109875 | 7/1982 | Japan |
| 58-46236 | 10/1983 | Japan |
| 59-161473 | 9/1984 | Japan |
| 61-83273 | 4/1986 | Japan |
| 63-48881 | 10/1988 | Japan |
| 2-235908 | 9/1990 | Japan |
| 2-248482 | 10/1990 | Japan |
| 4-25589 | 1/1992 | Japan |
| 4-353582 | 12/1992 | Japan |
| WO 93/09152 | 5/1993 | WIPO |
| WO 93/16131 | 8/1993 | WIPO |

OTHER PUBLICATIONS

*Encyclopedia of Polymer Science and Engineering*, vol. 8, pp. 279–289 (1987).

*Primary Examiner*—Michael Lusignan
*Attorney, Agent, or Firm*—Gary L. Griswold; Walter N. Kirn; Harold C. Knecht, III

[57] ABSTRACT

This invention relates to a process in which a composition is coated onto a substrate and crosslinked so as to form a PSA by means of polymerizing free radically polymerizable monomers from covalently attached pendent unsaturation in the polymer component of the composition. The coating can carried out by a wide variety of industrial methods because the process of the invention allows for compositions with a wide degree of possible viscosities.

28 Claims, No Drawings

5,741,543

PROCESS FOR THE PRODUCTION OF AN ARTICLE COATED WITH A CROSSLINKED PRESSURE SENSITIVE ADHESIVE

This application claims priority from PCT/US96/01827, which is a continuation-in-part of U.S. patent application Ser. No. 08/386,890, filed Feb. 10, 1995, now abandoned.

BACKGROUND OF THE INVENTION

1. Field of the Invention

This invention describes a process for the preparation of coated articles bearing on at least one surface thereof a crosslinked pressure sensitive adhesive. The crosslinking is accomplished by reaction of unsaturated groups pendent from a polymer backbone. At certain concentrations of monomer, the crosslinkable composition is of a coatable viscosity at or near ambient conditions, and this composition is also described.

2. Background Information

Acrylic pressure sensitive adhesives (PSAs), which exhibit good adherence to high energy (i.e., polar) substrates such as metal and painted steel surfaces and which have good performance properties at high temperatures (i.e., 100° C. or greater), are known in the art. Crosslinking acrylic compositions so as to form crosslinked PSAs is an area of much interest and research.

Solvent-processed acrylic PSA compositions can be crosslinked through the addition of polyfunctional crosslinking agents that react with functionalities within the polymer. See, e.g., Japanese Kokoku No. 58[1983]-046236. However, such processes result in the emission of solvent vapors.

Japanese Kokai No. 4[1992]-025589 describes a solventless process in which a polymer (obtained by blending and polymerizing an unsaturated monomer comprising a tertiary amino group, an unsaturated monomer comprising a hydroxyl group, and an unsaturated monomer comprising a carboxyl group) is reacted with a polyisocyanate. This process eliminates the need for solvents but requires an additional difficult polymer processing step. Similarly, a difficult polymer blending step is used in Japanese Kokoku No. 63[1988]-048881, where a polymer prepared from an α,β-ethylenically unsaturated monobasic acid is reacted with a copolymer of an α,β-ethylenically unsaturated monomer and an unsaturated aziridine compound.

The difficulty of additional processing steps, necessary to incorporate polyfunctional crosslinking agents into acrylic PSAs, can be avoided by the use of latent crosslinking reactions. This technique is exemplified in U.S. Pat. No. 4,812,541, where synergistic amounts of an N-vinyl lactam monomer and a glycidyl monomer are incorporated into an acrylate polymer to provide a high performance PSA; however, these latent crosslinked polyacrylates require postcuring that requires additional heat and/or time. Pendent functional group-containing polymers are also described in U.S. Pat. Nos. 4,908,229, 5,122,567, and 5,274,063.

The problems associated with solvent processing and crosslinking bulk-processed acrylate PSAs can be avoided through the use of actinic radiation processing. PSAs made by photopolymerizing an alkyl acrylate and a polar copolymerizable monomer (e.g., acrylic acid, N-vinyl pyrrolidone, etc.) are known in the art. See, e.g., U.S. Pat. Nos. RE 24,906, 4,181,752, 4,364,972, and 4,243,500. The cohesive strength of an acrylic PSA prepared in this manner can be increased if a photoactive crosslinking agent such as an aldehyde, a quinone, or a chromophore-substituted halomethyl-s-triazine is used in conjunction with a photoinitiator. See, e.g., U.S. Pat. Nos. 4,329,384, 4,330,590, 4,391,687, and 5,202,361. However, this type of photocrosslinking process is affected by the thickness of the composition.

The shear value of acrylic PSAs prepared by means of actinic radiation processing can be enhanced through the addition of polyacrylic crosslinking agents. Adhesive compositions crosslinked with a polyacrylic crosslinking agent are described in U.S. Pat. No. 4,379,201. Such adhesives often exhibit good shear properties, but the elastomer is a Type II semi-interpenetrating network that is sensitive to processing conditions.

Japanese Kokai No. 4[1992]-353582 describes a process that involves (1) photopolymerizing a mixture prepared from a monomer mixture of alkyl acrylates, the alkyl group of which has 2 to 14 carbon atoms, and a copolymerizable monoethylenically unsaturated monomer having a functional or polar group that controls the glass transition temperature ($T_g$) of the copolymer; (2) adding to the mixture a photoinitiator, an isocyanate to act as an anchoring force modifier (i.e., the isocyanate group bonds with the substrate), and, optionally, a polyfunctional acrylate; and (3) exposing the mixture to actinic radiation. The manner in which this process can be used to prepare a PSA having high shear strength is not taught or suggested. The best shear values listed are "at least 100 minutes" measured for a 500 g load applied at 80° C.

In addition to actinic radiation processing, acrylate PSAs can be applied to substrates by solvent and hot-melt coating techniques. Although solvent coating techniques are widely used, hot-melt coating techniques provide some environmental and economical advantages. However, unlike solvent coating techniques where the polymer coating and crosslinking are performed simultaneously, hot-melt coating requires that coating and crosslinking be performed sequentially. This is due to competing considerations: a polymer should not be crosslinked if it is to be hot-melt coated effectively, yet the polymer needs to be crosslinked to achieve certain desirable performance properties (e.g., high shear where the polymer is a PSA). Therefore, hot-melt coating is performed prior to crosslinking of the coated polymer.

Because hot-melt coating techniques involve high amounts of thermal energy and shear, the subsequent crosslinking procedure usually involves non-thermal energy sources. Electron beam (E-beam) and ultraviolet (UV) energy sources have been used traditionally, although E-beam techniques often are too energy intensive to be practical. Accordingly, much interest has been focused on UV radiation techniques.

UV radiation crosslinking of coated polymers has relied almost exclusively on hydrogen abstraction techniques in which a hydrogen abstracting agent (e.g., benzophenone or anthraquinone) is blended into the coated mixture prior to or during the coating process, and that mixture is then exposed to appropriate UV radiation. The separate mixing step can be eliminated where the hydrogen abstracting functionality is incorporated directly into the polymer backbone (i.e., a hydrogen abstracting moiety is attached to a copolymerizable unsaturated monomer which is copolymerized with other monomers). Although this latter technique provides a more efficient crosslinking mechanism, a substantial amount of high energy UV exposure is necessary to achieve a good degree of crosslinking because the energy necessary to activate the hydrogen abstracting moieties is relatively high. This limitation is especially pronounced where a thicker layer of crosslinked polymer is desired because introducing high levels of UV radiation deep into the polymer layer (to activate the local photoactivated hydrogen abstracting moieties) is difficult, especially where the met units of the polymer (or any additives present) absorb near the absorption maximum of the hydrogen abstracting moieties.

A representative disclosure as to the state of the art in hydrogen abstracting photocrosslinking can be found in WO 93/16131. The disclosed materials abstract hydrogen atoms from surrounding compounds when they are activated (e.g., by a relatively large dose of UV radiation) to a higher energy state. Crosslinking of the affected compounds occurs when free radicals from different polymer chains combine. This type of crosslinking is completely random because any compound with an abstractable hydrogen atom can be involved in the crosslinking reaction. This is not desirable especially where additives such as tackifiers, plasticizers, antioxidants, or other common additives are present.

Recently, the synthesis of an acrylic copolymer containing mer units derived from acrylate monomer(s), a functionalized hydrogen abstracting photoinitiator, and a functional group capable of further reaction has been described in U.S. Pat. No. 5,391,406. This polymer is reacted with a special methacrylic functional compound and crosslinked by exposure to UV radiation. Nevertheless, even this functionalized polymer suffers from the limitations of the hydrogen abstracting mechanism and from the fact that the photoactive group and the coreactive monomer have similar absorptive properties. Additionally, the resultant polymer is shown to have poor static shear strength, even at very thin coatings.

Norrish type I photoinitiators, such as α-cleaving initiators are known to require much less UV energy for activation than are corresponding Norrish type II photoinitiators such as hydrogen abstracting initiators; however, they have not been efficient initiators for crosslinking for acrylate polymers because they do not efficiently abstract hydrogen atoms. Nevertheless, Norrish type I photoinitiators, especially α-cleaving initiators, have remained the subject of much research because of their potential to initiate crosslinking polymers using low levels of UV radiation.

For example, EP-A-0 578 151 describes a coatable PSA to be crosslinked by activating functionalized α-cleaving photoinitiators from different chains which then combine to provide a crosslinked material. This process is inefficient because the photocrosslinking mechanism involves the free radical combination of functionalized photoinitiators (the statistically probability of which is low). To overcome this inefficiency, large amounts of relatively expensive functional photoinitiator have been used.

SUMMARY OF THE INVENTION

Briefly, the present invention provides a process for making a crosslinked PSA-coated substrate, comprising the steps of a) coating on a substrate a mixture that includes (1) a PSA polymer that includes a plurality of met units including pendent polymerizable unsaturation, (2) per 100 parts by weight (pbw) of the polymer, from 0 to about 10,000 pbw of one or more free radically polymerizable unsaturated monomers, and (3) an effective amount of an energy activated initiator of polymerization; and b) subjecting the coated mixture to energy that activates the initiator, which crosslinks the polymer (through the pendent unsaturated groups) and forms the crosslinked PSA.

In another aspect, the present invention provides a composition comprising (a) a solute PSA polymer that includes a plurality of met units including pendent polymerizable unsaturation, (b) at least one free radically polymerizable unsaturated solvent monomer, and (c) an energy activated initiator office radical polymerization. This composition is of a coatable viscosity at or near ambient conditions.

In addition, novel monomers useful in the preparation of the above-described composition and process also are provided. These monomers comprise α,β-unsaturation at one end and either α,β-unsaturation or an aziridinyl group at the other.

Unless otherwise indicated, the following definitions apply herein:

"compound" or "group" or "monomer" or "polymer" means a chemical species that can be substituted with conventional substituents that do not deleteriously affect the desired product;

"met unit" means a divalent structure formed from the polymerization of a monomer;

"(meth)acrylic" means acrylic and methacrylic;

"(meth)acrylate" means acrylate and methacrylate;

"unsaturation" or "unsaturated" means a functionality that is polymerizable by free radicals and includes, for example, acrylic, vinyloxy, ethylenic, and acetylenic groups;

"solute polymer" means a polymer of a type and concentration that is soluble in the remaining components of the mixture to be coated;

"solvent monomer(s)" means a monomer (or monomers) of a type and concentration capable of solvating any polymer present therewith;

"coatable viscosity" means a relatively constant viscosity that allows for relatively easy application to a substrate at or near ambient conditions;

"actinic radiation" means that radiation having a wavelength between 200 and 600 nm, preferably between 280 and 450 nm, more preferably between 300 and 450 nm, and which can be obtained from, for example, sunlight, mercury vapor and carbon arcs, black light and fluorescent lamps, argon and xenon glow lamps, electronic flash systems, and flood lamps; and "azlactyl" means the group remaining after the removal of the vinyl group from a vinyl azlactone, having the general formula

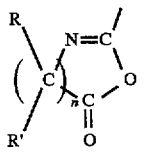

n = 1 or 2 wherein R and R' are independently hydrogen, a $C_1$ to $C_4$ alkyl group, a phenyl group, or, together with the carbon atom to which they are attached form a 5- or 6-membered ring group.

The process of the present invention results in a PSA having excellent peel adhesion and shear values at both ambient and elevated temperatures. The composition to be coated in the process of the present invention includes (1) a PSA polymer that has a plurality of pendent groups that comprise polymerizable unsaturation; (2) usually, at least one free radically-polymerizable unsaturated monomer, although certain coating procedures allow for the complete elimination of monomers from the composition; and (3) an energy activated initiator of free radical polymerization. Advantageously, the polymer can be the polymerization product of the monomer(s). Using a polymer that comprises a plurality of pendent polymerizable unsaturated groups eliminates the need to add conventional crosslinking agents (e.g., polyunsaturated monomers or photoactivated crosslinking agents such as benzophenone and halomethyl-s-triazines) to the coated mixture and allows for the easy production of PSAs of varying thicknesses.

Polymers that comprise a combination of mer units, one or more of which is derived from a monomer that is homopolymerizable to a polymer having a $T_g$ less than about 0° C. and, optionally, one or more of which is derived from a monomer that homopolymerizable to a polymer having a $T_g$ greater than about 50° C., provide PSAs with highly desirable properties.

The process of the present invention involves applying the polymer—monomer (optional)—initiator mixture to a substrate prior to crosslinking. This application can be accomplished by a solvent coating process, a hot-melt coating process, a syrup process (i.e., one in which a partially polymerized mixture of a coatable viscosity is applied to a substrate prior to completing polymerization), or any other coating process that can provide the desired coated substrate. The particular coating process chosen will depend on the monomer concentration. For example, a mixture with 0 to about 5 pbw monomer per 100 pbw polymer can be coated by many conventional techniques. However, where the mixture contains about 200 to about 10,000 (or more) pbw monomer per 100 pbw polymer, a syrup application process is preferred because of handling concerns. This allows for the simple production of articles comprising one or more layers of the composition or, after curing, a high strength PSA. Because the mixture to be coated can be of a coatable viscosity at or near ambient conditions, the monomer(s) of the monomer mixture can be polymerized after the mixture is applied to a substrate (i.e., a syrup application process can be used).

Upon curing, the coated mixture preferably provides a polymer that comprises a crosslinked macromolecule with backbone chains and at least one crosslinking chain (i.e., not an interpenetrating polymer network). Certain PSAs produced according to the process of the present invention have been found to exhibit superior theological properties (e.g., peel and shear) at both ambient and elevated temperatures. Such PSAs can be used for a variety of purposes including mounting, sealing, mending, holding, binding, joining, masking, labeling, insulating, laminating, protecting, vibration damping, and reinforcing.

DETAILED DESCRIPTION OF PREFERRED EMBODIMENTS

The process of the present invention involves the formation of crosslinked PSAs from coated polymers. These polymers include mer units that comprise pendent polymerizable unsaturation. When the unsaturated groups are activated by, for example, an activated photoinitiator, the unsaturated groups of different polymer chains can react to form crosslinks. Optional monomers may participate in a crosslinking mechanism. The present invention describes a process whereby these pendent unsaturated groups are attached at a concentration sufficiently high to allow for good crosslinking density, yet low enough so as to not prematurely gel (i.e., crosslink before the polymer can be coated onto a substrate).

The coatable, curable composition of the present invention includes a PSA polymer and, optionally, a monomer mixture. In one embodiment, the polymer is the polymerization product of the monomer(s).

The polymer component of the composition comprises one or more pendent groups that include polymerizable unsaturation. Preferred pendent unsaturated groups include (meth)acryloyl, (meth)acryloxy, propargyl, and (meth)acrylamido. Such pendent groups can be incorporated into the polymer in at least two ways. The most direct method is to include among the mer units of ethylene di(meth)acrylate, 1,6-hexanediol diacrylate (HDDA), bisphenol-A the polymer some units derived from a polyunsaturated monomer. Useful polyunsaturated monomers include allyl, propargyl, and crotyl (meth)acrylates, di(meth)acrylate, trimethylolpropane triacrylate, pentaerythritol triacrylate, and allyl 2-acrylamido-2,2-dimethylacetate. The syntheses of several polyunsaturated monomers are described in the Examples section, below.

A less direct method of incorporating into the solute polymer pendent groups that comprise polymerizable unsaturation is to include among the mer units of the polymer some derived from an unsaturated monomer that comprises a functional group capable of further reaction. Useful functional groups include, but are not limited to, hydroxyl, amino (especially secondary amino), azlactyl, oxazolinyl, acetoacetyl, carboxyl, isocyanato, epoxy, aziridinyl, acyl halide, vinyloxy, and cyclic anhydride groups. Preferred among these are carboxyl, hydroxyl, aziridinyl, and vinyloxy groups. (A more detailed discussion of the incorporation of such mer units into the polymer of the composition of the present invention is set forth below in the Examples.) These pendent functional groups are reacted with unsaturated monomers that comprise a functional group that is coreactive with the pendent functional group. When the two functional groups react, a polymer with pendent unsaturation results.

Where the PSA polymer is to be hot-melt processed and the direct method of including pendent unsaturation has been used, extreme care must be taken not to activate those pendent groups and cause premature gellation of the polymer. (For example, hot-melt processing temperatures can be kept relatively low and polymerization inhibitors can be added to the mixture.) Accordingly, where a hot-melt process is to be used to coat the PSA polymer, the above-described less direct method is the preferred way of incorporating the pendent unsaturated groups.

In the Examples, the preparation of a PSA polymer is exemplified for Type I compositions in which the solute polymer comprises a pendent carboxyl group; Type II compositions in which the solute polymer comprises a pendent hydroxyl group; and Type III compositions in which the solute polymer is prepared from a monomer mixture that comprises a polyunsaturated monomer(s) so that pendent unsaturation has been included directly in the polymer.

The polymer and the monomer mixture of the composition to be coated in the process of the present invention are based, in substantial part, on free radically-polymerizable unsaturated monomers. These monomers comprise from 95 to 100 parts by weight (pbw), preferably 97 to 100 pbw, of the monomer mixture. Also, 95 to 100% (by wt.) of the mer units of the polymer preferably are derived from such monomers. Preferred free radically-polymerizable unsaturated monomers are (meth)acrylic acid and its numerous, well known derivatives.

Particularly preferred among such monomers are monoethylenically unsaturated monomers that are homopolymerizable to a polymer having a $T_g$ less than about 0° C.

(hereinafter "A monomers"). These monomers preferably constitute from about 50 to 100 pbw, more preferably from about 60 to 97 pbw of the solvent monomer mixture of the composition of the present invention. Common examples of A monomers include (meth)acrylic acid esters of monohydric alcohols. Preferred among these are monofunctional esters of non-tertiary alcohols, particularly primary alcohols. Those (meth)acrylic acid esters wherein the alkyl portion of the ester contains from 4 to 12 carbon atoms have been found to be especially useful. Such monomers include, but are not limited to, isooctyl acrylate, butyl acrylate, hexyl acrylate, 2-ethylhexyl acrylate, isonomyl acrylate, decyl acrylate, and dodecyl acrylate. Isooctyl acrylate, butyl acrylate, and 2-ethylhexyl acrylate are examples of particularly preferred A monomers.

Monoethylenically unsaturated monomers that are homopolymerizable to a polymer with a $T_g$ greater than about 50° C. (hereinafter "B monomers") can also be included in the free radically-polymerizable unsaturated portion of the monomer mixture of the composition of the present invention. B monomers can constitute from 0 to 50 pbw, preferably from about 0.1 to 50 pbw, more preferably from about 5 to about 40 pbw, of the monomer mixture. Examples of useful B monomers include, but are not limited to, strongly polar monomers such as (meth)acrylic acid, itaconic acid, and substituted (meth)acrylamides such as N,N-dimethylacrylamide and N-octylacrylamide; moderately polar monomers such as N-vinyl pyrrolidone, N-vinyl caprolactam, acrylonitrile, and tetrahydrofurfuryl acrylate; and non-polar monomers such as for example, isobornyl acrylate. (Meth)acrylic acid, N-vinyl pyrrolidone, N-vinyl caprolactam, and isobornyl acrylate are preferred. Of these, acrylic acid and isobornyl acrylate are most preferred, especially where the pendent functional group capable of further reaction (in the solute polymer) is to be a carboxyl group.

Where none of the mer units of the PSA polymer derived from free radically-polymerizable unsaturated monomers (i.e., A and B monomers) comprises a pendent functional group capable of further reaction, the polymer must contain some mer units derived from one or more (a) polyunsaturated monomers or (b) unsaturated monomers that comprise a pendent functional group capable of further reaction (hereinafter "C monomers").

Preferred polyunsaturated monomers are those where the unsaturated groups are of unequal reactivity. (Those skilled in the art recognize that the particular moieties attached to the unsaturated groups affect the relative reactivities of those unsaturated groups.) For example, where a polyunsaturated monomer having unsaturated groups of equal reactivity (e.g., HDDA) is used, premature gellation of the composition must be guarded against by, for example, the presence of oxygen, which deactivates some of the unsaturated groups. Conversely, where a polyunsaturated monomer having unsaturated groups of differing reactivities is used, the more reactive group preferentially ties into the polymer backbone before the other unsaturated group has a chance to react to a great extent.

Useful C monomers include those unsaturated aliphatic, cycloaliphatic, and aromatic compounds having up to about 36 carbon atoms that include a functional group capable of further reaction, such as a hydroxyl, amino, azlactyl, oxazolinyl, 3-oxobutanoyl (i.e., acetoacetyl), carboxyl, isocyanato, epoxy, aziridinyl, acyl halide, vinyloxy, or cyclic anhydride group.

Preferred C monomers have the general formula

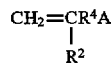

wherein $R^2$ is hydrogen, a $C_1$ to $C_4$ alkyl group, or a phenyl group, preferably hydrogen or a methyl group; $R^4$ is a single bond or a divalent linking group that joins an ethylenically unsaturated group to functional group A and preferably contains up to 34, preferably up to 18, more preferably up to 10, carbon and, optionally, oxygen and nitrogen atoms and, when $R^4$ is not a single bond, is preferably selected from

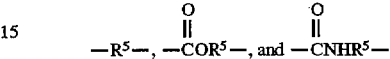

in which $R^5$ is an alkylene group having 1 to 6 carbon atoms, a 5- or 6-membered cycloalkylene group having 5 to 10 carbon atoms, or an alkylene-oxyalkylene or an alkyleneoxycarbonylaminoalkylene group in which each alkylene includes 1 to 6 carbon atoms or is a divalent aromatic group having 6 to 16 carbon atoms; and A is a functional group, capable of reaction with a synergistic functional group (which is part of an unsaturated monomer) to form a covalent bond, preferably selected from the class consisting of hydroxyl, amino (especially secondary amino), carboxyl, isocyanato, aziridinyl, epoxy, acyl halide, vinyloxy, azlactyl, oxazolinyl, acetoacetyl, and cyclic anhydride groups.

Representative hydroxyl group-substituted C monomers include the hydroxyalkyl (meth)acrylates and hydroxyalkyl (meth)acrylamides such as 2-hydroxyethyl (meth)acrylate, 2-hydroxypropyl (meth)acrylate; 3-chloro-2-hydroxypropylmethyl (meth)acrylate, 2-hydroxyethyl (meth)acrylamide, 4-hydroxycyclohexyl (meth)acrylate, 3-acryloyloxyphenol, 2-(4-acryloyloxyphenyl)-2-(4-hydroxyphenyl)propane (also called bisphenol A monoacrylate), 2-propyn-1-ol, and 3-butyn-1-ol.

Representative amino group-substituted C monomers include 2-methyl aminoethyl (meth)acrylate, 3-aminopropyl (meth)acrylate, 4-aminocyclohexyl (meth)acrylate, N-(3-aminophenyl)acrylamide, 4-aminostyrene, N-acryloylethylenediamine, and 4-aminophenyl-4-acrylamidophenylsulfone.

Representative azlactyl group-substituted C monomers include 2-ethenyl-1,3-oxazolin-5-one; 2-ethenyl-4-methyl-1,3-oxazolin-5-one; 2-isopropenyl-1,3-oxazolin-5-one; 2-isopropenyl-4-methyl-1,3-oxazolin-5-one; 2-ethenyl-4,4-dimethyl-1,3-oxazolin-5-one; 2-isopropenyl-4,4-dimethyl-1,3-oxazolin-5-one; 2-ethenyl-4-methyl-4-ethyl-1,3-oxazolin-5-one; 2-isopropenyl-3-oxa-1-aza[4.5]spirodec-1-ene-4-one; 2-ethenyl-5,6-dihydro-4H-1,3-oxazin-6-one; 2-ethenyl-4,5,6,7-tetrahydro-1,3-oxazepin-7-one; 2-isopropenyl-5,6-dihydro-5,5-di(2-methylphenyl)-4H-1,3-oxazin-6-one; 2-acryloyloxy-1,3-oxazolin-5-one; 2-(2-acryloyloxy)ethyl-4,4-dimethyl-1,3-oxazolin-5-one; 2-ethenyl-4,5-dihydro-6H-1,3-oxazin-6-one, and 2-ethenyl-4,5-dihydro-4,4-dimethyl-6H-1,3-oxazin-6-one.

Representative oxazolinyl group-substituted C monomers include 2-vinyl-2-oxazoline, 2-isopropenyl-2-oxazoline, 2-(5-hexenyl)-2-oxazoline, 2-acryloxy-2-oxazoline, 2-(4-acryloxyphenyl)-2-oxazoline, and 2-methacryloxy-2-oxazoline.

Representative acetoacetyl group-substituted C monomers include 2-(acetoacetoxy)ethyl (meth)acrylate, styryl acetoacetate, isopropenyl acetoacetate, and hex-5-enyl acetoacetate.

Representative carboxyl group-substituted C monomers include (meth)acrylic acid, 2-carboxyethyl (meth)acrylate, 3-carboxypropyl (meth)acrylate, 2-carboxyphenyl (meth)acrylate, 3-methyl-5-carboxyphenyl (meth)acrylate, 4-carboxybenzyl (meth)acrylate, mono-2-acryloyloxyethyl phthalate, 2-butynoic acid, and 4-pentynoic acid.

Representative isocyanate group-substituted C monomers include 2-isocyanatoethyl (meth)acrylate, 3-isocyanatopropyl (meth)acrylate, 4-isocyanatocyclohexyl (meth)acrylate, 4-isocyanatostyrene, 2-methyl-2-propenoyl isocyanate, 4-(2-acryloyloxyethoxycarbonylamino) phenylisocyanate, allyl 2-isocyanatoethylether, and 3-isocyanato-1-propene.

Representative epoxy group-substituted C monomers include glycidyl (meth)acrylate, thioglycidyl (meth) acrylate, 3-(2,3-epoxypropxy)phenyl (meth)acrylate, 2-[4-(2,3-epoxypropoxy)phenyl]-2-(4-acryloyloxyphenyl) propane, 4-(2,3-epoxypropoxy)cyclohexyl (meth)acrylate, 2,3-epoxycyclohexyl (meth)acrylate, and 3,4-epoxycyclohexyl (meth)acrylate.

Representative aziridinyl group-substituted C monomers include N-(meth)acrylaziridine, 2-(1-aziridinyl)ethyl (meth) acrylate, 4-(1-aziridinyl)butyl (meth)acrylate, 2-[2-(1-aziridinyl)ethoxy]ethyl (meth)acrylate, 2-[2-(1- aziridinyl) ethoxycarbonylamino]ethyl (meth)acrylate, 12-[2-(2,2,3,3-tetramethyl-1-aziridinyl)ethoxycarbonylamino]dodecyl (meth)acrylate, and 1-(2-propenyl)aziridine.

Representative acyl halide group-substituted C monomers include (meth)acryloyl chloride, a-chloroacryloyl chloride, acryloyloxyacetyl chloride, 5-hexenyl chloride, 2-(acryloyloxy) propionyl chloride, 3-(acryloylthioxy) propionyl chloride, and 3-(N-acryloyl-N-methylamino) propionyl chloride.

Representative vinyloxy group-substituted C monomers include 2-(ethenyloxy)ethyl (meth)acrylate, 3-(ethynyloxy) -1-propene, 4-(ethynyloxy)-1-butene, and 4-(ethenyloxy) butyl-2-acrylamido-2,2-dimethylacetate. Two vinyloxy-substituted ethylenically unsaturated monomers are shown below in Tables II and III (see Examples section).

Representative anhydride group-substituted C monomers include maleic anhydride, acrylic anhydride, itaconic anhydride, 3-acryloyloxyphthalic anhydride, and 2-methacryloxycyclohexanedicarboxylic acid anhydride.

Novel C monomers described in the present invention (see the Examples section) have the general formula $$CH_2=C(R)-CX-Y-CO-BZ$$
(with two C=O groups)

wherein
R is hydrogen or a methyl group,
X is O or NH,
Y is

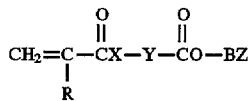

where x is an integer from 1 to 4,
B is

—(CH$_2$)$_x$E in which x is defined as before and E is a single bond, O, or OC(O), and Z is

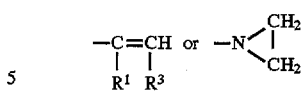

in which $R^1$ and $R^3$ are independently hydrogen or a methyl group.

For the resultant polymer to exhibit PSA properties and maintain good processability and crosslinkability, from about 0.001 to about 5% (by wt.), preferably from about 0.01 to about 3% (by wt.), more preferably from about 0.05 to about 2% (by wt.), and most preferably from about 0.1 to about 1% (by wt.) of the mer units of the polymer should comprise pendent unsaturated groups. A preferred polymer comprises 50 to 99.9% (by wt.) mer units derived from an A monomer, 0 to 50% (by wt.) mer units derived from a B monomer, and about 0.01 to about 3% (by wt.), more preferably from about 0.05 to about 2% (by wt.), most preferably from about 0.1 to about 1% (by wt.), mer units derived from one or more polyunsaturated and/or C monomers.

For syrup application processing, a preferred monomer mixture comprises 50 to 100 pbw of one or more A monomers, 0 to 50 pbw of one or more B monomers, and, per 100 pbw of A and B monomers, 0 to about 3 pbw of a polyunsaturated or C monomer. A preferred composition includes this monomer mixture and the polymer formed by partially polymerizing this mixture.

Where some mer units of the polymer component have been derived from a polyunsaturated monomer (i.e., the polymer as made comprises pendent unsaturation), the composition can be crosslinked without any further modification. However, where some mer units of the polymer have been derived from one or more C monomers or where mer units derived from one or more of the free radically-polymerizable unsaturated monomers include a pendent functional group capable of further reaction, the functional groups pendent from those mer units are reacted with an unsaturated monomer comprising a functional group that is coreactive with the functional group (hereinafter "D monomers") to provide pendent unsaturation that is covalently attached to the polymer backbone. Useful D monomers include those compounds listed above as being useful as C monomers so long as the functional group of the chosen D monomer is coreactive with the functional group of the mer units derived from whichever C monomer is used. By "coreactive" is meant that the functional group of the D monomer reacts with the functional group of the C monomer in such a way so as to form a covalent bond.

To aid in the understanding of this interaction between coreactive first and second functional groups, Table I summarizes some possible combinations of functional groups, using carboxyl and hydroxyl groups as representative examples. Those skilled in the art will readily recognize how other previously described functional groups also can be used to form covalent linking groups.

TABLE I

| Functional group from C monomer | Coreactive functional group from D monomer | | Resultant linking group |
|---|---|---|---|
| carboxyl $-\overset{O}{\overset{\|}{C}}OH$ | oxazolinyl | $\begin{array}{c} R^{12} \\ R^{12}-C \\ \| \\ R^{12}-C \\ / \\ R^{12} \end{array} \overset{N}{\underset{O}{\diagdown}} C-$ | $-\overset{O}{\overset{\|}{C}}O-\overset{R^{12}}{\underset{R^{12}}{\overset{\|}{C}}}-\overset{R^{12}}{\underset{R^{12}}{\overset{\|}{C}}}-NH\overset{O}{\overset{\|}{C}}-$ |
| | vinyloxy | $R^{13}HC=C\overset{R^{14}}{\underset{O-}{\diagup}}$ | $-\overset{O}{\overset{\|}{C}}O\overset{CH_2R^{13}}{\underset{R^{14}}{\overset{\|}{C}}}O-$ |
| | aziridinyl | $\begin{array}{c} R^{12} \\ \| \\ R^{12}-C \\ \diagdown \\ N- \\ \diagup \\ R^{12}-C \\ \| \\ R^{12} \end{array}$ | $-\overset{O}{\overset{\|}{C}}O\overset{R^{12}}{\underset{R^{12}}{\overset{\|}{C}}}-\overset{R^{12}}{\underset{R^{12}}{\overset{\|}{C}}}NH-$ |
| | epoxy | $R^{12}-\overset{R^{12}}{\underset{R^{12}}{\overset{O}{\overset{\diagup\diagdown}{C——C}}}}-$ | $-\overset{O}{\overset{\|}{C}}O\overset{R^{12}}{\underset{R^{12}}{\overset{\|}{C}}}-\overset{OH}{\underset{R^{12}}{\overset{\|}{C}}}-$ |
| hydroxyl $-OH$ | isocyanato | $O=C=N-$ | $-O\overset{}{C}NH-$ $\overset{\|}{O}$ |
| | acid halide | $\overset{O}{\overset{\|}{X C}}-$ | $\overset{O}{\overset{\|}{-OC}}-$ |
| | azlactyl | $\begin{array}{c} R^{12} \\ \diagdown \\ (C)_n \\ \diagup \\ R^{12} \end{array} \overset{N=C}{\underset{\overset{C}{\overset{\|}{O}}}{\diagdown O \diagup}}$ | $-O\overset{O}{\overset{\|}{C}}-(\overset{R^{12}}{\underset{R^{12}}{\overset{\|}{C}}})_n-NH\overset{O}{\overset{\|}{C}}-$ |
| | | $n=1\ or\ 2$ | |
| | (thio)epoxy | $R^{12}-\overset{R^{12}}{\underset{R^{12}}{\overset{G}{\overset{\diagup\diagdown}{C——C}}}}-$ | $-O\overset{R^{12}}{\underset{R^{12}}{\overset{\|}{C}}}-\overset{G-H}{\underset{R^{12}}{\overset{\|}{C}}}-$ |
| | | $G = O\ or\ S$ | |

In Table I, each $R^{12}$ is independently hydrogen, an alkyl group having 1 to 4 carbon atoms, or a phenyl group. $R^{13}$ and $R^{14}$ are independently hydrogen or an alkyl group containing from 1 to about 4 carbon atoms, although $R^{13}$ and $R^{14}$ preferably are not both alkyl groups.

As discussed previously, the composition of the present invention comprises a PSA polymer with pendent unsaturation, an initiator, and optionally a monomer mixture. Formation of the composition (i.e., the bringing together of the polymer, the monomer mixture, and the photoinitiator) can be accomplished in several ways. Preferably, they are brought together after the PSA polymer has been formed.

First, the polymer can be made (e.g., by solution polymerization followed by isolation) and then added to a separately prepared monomer mixture. Depending on the type of coating process to be used, the relative amounts of polymer and monomer can vary greatly. For example, where the coating is to be done by a solvent or hot-melt process, the relative amount of polymer preferably is quite high (e.g., from 0 to about 5 pbw, preferably from about 0 to about 2 pbw monomer per 100 pbw polymer). However, where coating is to be done by a syrup application process, the relative amount of polymer preferably is low (e.g., about 200 to about 10,000 pbw monomer per 100 pbw polymer). In such a situation, the polymer preferably is added at a concentration of 1 to 60% (by wt.), more preferably at 1 to 40% (by wt.), even more preferably 1 to 10% (by wt.). When the separately prepared polymer comprises a plurality of pendent functional groups capable of further reaction (i.e., no pendent unsaturation is present), about 0.05 to about 2 pbw, preferably about 0.1 to about 1 pbw D monomers (per 100 pbw of the monomer mixture) are also added to the composition.

Second, and preferably where a syrup application process is to be used, the monomer mixture can be partially polymerized (i.e., the polymer can be formed in situ). When this is done, up to about 30% (by wt.), preferably up to about 15% (by wt.), more preferably up to about 10% (by wt.), and most preferably up to about 5% (by wt.) of the monomers are polymerized. This provides a solution of a polymer in one or more solvent monomers. This monomer mixture contains from about 0 to about 3 pbw, preferably about 0.05 to about 2 pbw of polyunsaturated and/or C monomer(s) per 100 pbw of total A and, when present, B monomers. (In this embodiment, the monomer mixture must contain some polyunsaturated and/or C monomer where neither the A monomer or the B monomer comprises a functional group capable of further reaction once those monomers have been polymerized.) This method of forming the composition of the present invention has the advantage of allowing for compositions in which very high molecular weight polymers are solubilized in a monomer mixture.

Where a polyunsaturated compound is not incorporated directly into the polymer nor is included in the monomer mixture, some D monomer(s) must be introduced into the polymer-monomer solution above. Where the second method described above has been used, this is done after the other monomer(s) has/have been partially polymerized. Enough D monomer(s) is/are added so that the amount of coreactive functional groups provided thereby is approximately equivalent to the amount of functional groups present in the other monomer(s). The functional groups of the D monomers then react with those pendent from the backbone of the polymer to provide a polymer with pendent unsaturated groups covalently attached thereto.

D monomers can also be used in combination with appropriate coreactive groups (whether or not derived from C monomers) to provide pendent unsaturation to acrylate-type polymers that are to be solvent, water-based, or hot-melt coated. The reaction of a D monomer with a coreactive functional group can be done prior to or during the hot-melt process. The pendent unsaturation provided by this type of reaction can produce reactive sites that can be useful in free radical-type crosslinking reactions involving an energy-activated source of free radicals and an appropriate energy source.

Of course, if so desired, one or more polyunsaturated monomers can be combined with one or more C monomers to provide a mixed monomer composition. For the mer units derived from the C monomers to participate in subsequent polymerization and/or crosslinking, the C monomer functional groups need to be reacted with appropriate D monomer(s) so as to form a covalent linkage, as described above. Also, an unsaturated monomer with a photoactive moiety as a portion thereof can also be included in the monomer mixture. Examples of such monomers are Irgacure™ ZLI-3331 (Ciba Geigy Corp.; Ardsley, N.Y.) and acryloxybenzophenone.

For some end use applications, the addition of microspheres (as described in U.S. Pat. Nos. 3,615,972 and 4,223,067) and/or gas bubbles (as described in U.S. Pat. No. 4,415,615) to the composition can be desirable. Another particularly useful adjuvant is fumed silica, especially hydrophobic silica (as disclosed in U.S. Pat. Nos. 4,710,536 and 4,749,590). For example, to 10 pbw composition can be added from about 2 to about 15 pbw hydrophobic silica. Other useful adjuvants that can be blended into the composition of the present invention include, but are not limited to, fillers, pigments, plasticizers, fibrous reinforcing agents, woven and nonwoven fabrics, foaming agents, chain transfer agents, polymerization inhibitors, tackifiers, gaseous fillers, antioxidants, stabilizers, fire retardants, and viscosity modifying agents. Of these, tackifiers, plasticizers, chain transfer agents, and polymerization inhibitors can be particularly useful.

Where a composition to be coated in the process of the present invention is to be coated by a syrup application process, regardless of how the polymer and monomer(s) are brought together, the composition preferably has a viscosity of from about 500 to 10,000 cP, more preferably from about 750 to 7500 cP. This type of composition can be coated on a substrate, preferably a flexible carrier web, prior to being crosslinked. Coating can be accomplished by any conventional means such as roller, dip, knife, or extrusion coating. The use of a composition of a coatable viscosity provides the advantage of allowing the remaining monomer(s) to be polymerized after they have been applied to a substrate.

Where the polymer component of the composition is formed in situ, the partial polymerization can be accomplished by, for example, exposing the monomer mixture to energy, in the presence of a energy activated initiator of free radical polymerization, i.e., a compound that generates a free radical upon being exposed to a source of energy such as heat (thermally activated initiators) or actinic radiation (photoinitiators). Energy activated initiators can be unnecessary where, for example, ionizing radiation is used to initiate polymerization. Any energy activated source of free radicals that is used is preferably present in an amount from about 0.001 to about 5 pbw, more preferably from about 0.005 to about 2 pbw, most preferably from about 0.01 to about 1 pbw, per 100 pbw of the solvent monomer mixture.

Where actinic radiation is used to polymerize the monomer mixture (when present), intensities can range from about 0.1 to about 150 mW/cm$^2$, preferably from about 0.5 to about 100 mW/cm$^2$, and more preferably from about 0.5 to about 50 mW/cm$^2$. Useful photoinitiators include benzoin ethers such as benzoin methyl ether and benzoin isopropyl ether; substituted acetophenones such as 2,2-diethoxyacetophenone, available as Irgacure™ 651 photoinitiator (Ciba-Geigy Corp.;), 2,2-dimethoxy-2-phenyl-1-phenylethanone, available as Esacure™ KB-1 photoinitiator (Sartomer Co.; W. Chester, Pa.), and dimethoxyhydroxyacetophenone; substituted α-ketols such as 2-methyl-2-hydroxy propiophenone; aromatic sulfonyl chlorides such as 2-naphthalene sulfonyl chloride; and photoactive oximes, such as 1-phenyl-1,2-propanedione-2-(O-ethoxycarbonyl) oxime.

Where a solvent or hot-melt coating process is used to apply the composition to a substrate, a photoinitiator preferably is included to initiate the crosslinking reaction. Initiator concentration for crosslinking purposes preferably is between about 0.01 to about 5 pbw, more preferably about 0.1 to about 2 pbw, most preferably about 0.2 to about I pbw per 100 pbw of coated mixture.

For crosslinking, α-cleaving type photoinitiators are preferred. The photoinitiator(s) can be added to the mixture to be coated after the polymer has been formed (i.e., photoinitiator can be added to the solvent mixture or bulk polymer, depending on the type of coating method to be used). The photoinitiator also can be added to the mixture prior to formation of the polymer; however, a sufficient amount of photoinitiator needs to be present for use in the crosslinking step. In this type of situation, the type of energy used to initiate polymerization preferably does not activate the crosslinker (e.g., a thermal polymerization followed by a photoactivated crosslinking).

Preferably, any photoinitiator used has an absorbance maximum of about 280 nm or greater which means that it will not absorb in the same spectral region as do (meth)

acrylate monomers and mer units derived therefrom. Accordingly, relatively thick coatings (e.g., at least about 0.05 mm, preferably at least about 0.10 mm, more preferably at least about 0.15 mm thick) can be achieved, although thin comings (e.g., 0.005 to about 0.05 ram) are of course achievable. (Even coatings on the scale of 0.5 up to 2 mm thick are possible and are within the scope of the present invention. All of these thicknesses are for dried coatings.) Such photoinitiators preferably are present in an amount of from 0.1 to 1.0 pbw per 100 pbw of the PSA polymer.

Where actinic radiation is to be used to crosslink the PSA polymer, high intensities and short exposure times are preferred. For example, an intensity of 600 mW/cm$^2$ with an exposure time of about 1 second can be used successfully. However, longer exposure times and lower radiation doses also are contemplated and within the scope of the present invention.

Where heat is used, heating the monomer mixture to a temperature of from 30° to 120° C., preferably from 40° to 100° C., for a time from a few minutes to a few hours, depending upon concentration and choice of thermally activated initiators, effects sufficient polymerization to form the polymer component. Examples of thermally activated sources of free radicals include benzoyl peroxide, t-butyl perbenzoate, cumene hydroperoxide, azobis (isobutyronitrile), and methyl ethyl ketoperoxide.

A composition to be coated according to the process of the present invention (with no monomer, a little monomer, a significant amount of monomer) can be polymerized (and/or crosslinked) with thermal initiators. Where thermal initiation is used to polymerize these compositions, processing conditions as described in laid open patent application number WO 95/29770 are useful. Examples of thermally activated initiators include azo initiators (e.g., azobis (isobutyronitrile), 2,2'-azobis-2-methylbutyronitrile), persulfate initiators (e.g., potassium persulfate, sodium persulfate), redox initiators (e.g., oxidation-reduction pairs such as potassium persulfate and sodium metabisulfite), and peroxide initiators (e.g., benzoyl peroxide, t-butyl perbenzoate). Azo initiators are preferred. Peroxide initiators can be used but they generally require the addition of chain transfer agents to minimize excess gelation of the polymer which can adversely impact its adhesive performance. Coated materials are exposed to appropriate temperatures to product a high performance PSA material.

Polymer containing pendent unsaturated groups can be hot-melt coated in the temperature range 120° C. to 190° C. with the addition of photoinitiator and inhibitor. Inhibitor concentrations preferably are selected to minimize gelation during processing while allowing desired post photo-crosslinking. Photoinitiators preferably are selected such that they have sufficient thermal stability to survive (i.e., minimum initiator degradation) under hot melt processing conditions. Coated materials are exposed to appropriate UV radiation to produce a high performance PSA material.

Polymer containing pendent unsaturated groups can also be solvent processed. Polymer solutions, containing optional monomer(s) and either photo or thermal initiators, having coatable viscosities in the range of 3000 to 100,000 cP can be coated on a carrier web or release liner, dried to 90% or higher solids and cured to high performance PSA materials. Preferably the dried coatings are crosslinked by exposure to UV radiation.

If so desired, extent of polymerization can be monitored by measuring the refractive index of the PSA polymer/crosslinked PSA material. Refractive index changes linearly from about 1.43 at the composition stage to about 1.47 at 100% reaction. This monitoring method is commonly applied in polymerization kinetics work. See discussions about the method in, for example, G. P. Gladyshev and K. M Gibov, *Polymerization at Advanced Degrees of Conversion*, Keter Press, Jerusalem (1970).

When cured (i.e., crosslinked), the composition provides a PSA with good high temperature performance. Useful curing methods include exposing the composition to energy such as heat and/or ionizing or actinic radiation. Depending on the intensity of the energy source, concentration of initiator and monomer, the particular monomer(s) used, and the thickness of the composition, the length of exposure to energy that is necessary to cure the composition can range from about 1 second (or less) to about 20 minutes.

Where a syrup application process is used, crosslinking preferably occurs in an inert atmosphere (e.g., an oxygen-free atmosphere such as nitrogen or argon), although oxygen concentrations of as high as 600 parts per million (ppm) or more can be tolerated, even where PSAs with high shear values are desired. The composition can be photocured in an oxygen rich environment by covering a layer of the composition with a barrier film that is substantially transparent to the radiation being used but impervious to oxygen (although, as explained above, oxygen concentrations of about 600 ppm can be tolerated) and subsequently irradiating the composition through the film. (If UV lamps are used, they should emit radiation in the wavelength range absorbed by the particular photoinitiator used.) Several different commercially available lamps can be used. These include medium pressure mercury lamps and low intensity fluorescent lamps, each having various emission spectra and emission maxima between 280 and 600 nm, preferably between 300 and 450 nm, more preferably between 310 and 400 nm. In general, the total radiation dose should be greater than 50 mJ/cm$^2$, preferably between about 200 and 1600 mJ/cm$^2$ as measured according to a method consistent with those published by the U.S. National Institute of Standards and Technology. Maximum efficiency and rate of polymerization is dictated by the relationship between emission properties of the radiation source and the absorption properties of the photoactive compounds employed.

When the composition of the present invention is cured, it provides a PSA with a shear strength at both room temperature (i.e., about 22° C.) and 70° C. of at least 300 minutes, preferably at least 1000 minutes, more preferably at least 10,000 minutes, determined according to the method described below in the Examples section.

Articles that include the composition of the present invention (or the PSA prepared therefrom) can contain more than one layer. Such multilayered articles can include at least one layer of the composition or of the PSA and one or more layers of a substrate, preferably a flexible substrate, more preferably a flexible carrier web. If desired, such an article can have a layer of a different viscoelastomeric material laminated thereto. In such an article, the PSA prepared from the composition of the present invention can be a backing or core layer. The additional layer(s) is/are preferably any conventional adhesive known in the art; however, acrylic adhesives, particularly acrylic PSAs, are preferred. Such multilayered constructions can be prepared by processes disclosed in U.S. Pat. Nos. 4,818,610, 4,894,259, and 4,895,738, the teachings of which are incorporated herein by reference.

Objects and advantages of this invention are further illustrated by the following examples. The particular materials and amounts thereof, as well as other conditions and details, recited in these examples should not be used to unduly limit this invention.

EXAMPLES

Test Methods

The tests described below were used to evaluate PSA tapes made from compositions of the present invention.

1. Static Shear Value

The release liner-coated adhesive films described in the examples were cut into strips 2.54 cm wide and placed across a flat, rigid stainless steel plate (1.27 cm×about 5 cm). The stainless steel plate had been previously washed once with acetone and three times with a 50/50 mixture of isopropanol and water. Excess film was cut from the sides of the plate, and the release liners were removed from the adhesive films. Onto portions of each of the exposed adhesives were placed strips of anodized aluminum foil (125 µm thick, 1.6 cm wide, about 10 cm long). Moderate pressure was applied to each assembly to assure good surface contact. Each adhesive strip was pressed with several passes of a 6 kg roller and allowed to sit for four hours before testing was begun.

Some samples were hung at room temperature (e.g., about 22° C.) and others in an air circulating oven preheated to 70° C. From the free end of the foil strip of each sample, a weight (1 kg for the room temperature test and 500 g for the 70° C. test) was suspended. The assembly was tilted 2° from vertical to minimize normal forces from the shear force. The time (in minutes) at which the weight fell was noted as the shear strength. If no failure had occurred after 10,000 minutes, the test was discontinued and the value recorded as 10,000+".

2. 90° Peel

The adhesive layer to be tested was slit to a width of 1.27 cm and self-adhered to a clean, smooth stainless steel plate that had been washed once with acetone and three times with a 50/50 isopropanol-water mixture. A 1.6 cm-wide strip of 125 mm-thick anodized aluminum foil was adhered to the exposed face of the adhesive layer under the weight of a 2.25-kg hard rubber-covered steel roller, using two passes in each direction. After a 20 minute dwell time (or a 72 hour dwell time, where indicated in the tables) at room temperature, a tensile tester was used to move the free end of the tape away from the steel plate at an angle of 90° and a rate of about 0.5 cm/sec.

3. 180° Peel

The adhesive tape to be tested was slit to a width of 2.54 cm and applied to a smooth glass plate that had been washed once with diacetone alcohol. The tape was adhered to the glass plate with one pass of a 2.25 kg hard rubber-covered roller and allowed to sit at room temperature for the time indicated in the tables. A free end of the tape was connected by a stirrup to a tensile tester and pulled from the test plate at an angle of 180° by moving the plate away from the tensile tester at a rate of about 7.6 cm/sec.

Synthesis of Polyunsaturated Compounds

1. Allyl 2-acrylamido-2-methyl propionate (ALAZ)

Into a 200 ml round bottom flask containing a magnetic stirrer were added 14.2 g 2-vinyl-4,4-dimethyl-2-oxazolin-5-one (hereinafter "AZL", available from SNPE Inc.; Princeton, N.J.), 5.92 g allyl alcohol (Aldrich Chem. Co.; Milwaukee, Wis.), and 20.2 g isooctyl acrylate (hereinafter "IOA", prepared according to methods known in the art). The stirrer was activated and 0.76 g 1,8-diazabicyclo[5.4.0] undec-7-ene (hereinafter "DBU", available from Aldrich) was added.

Progress of the reaction was monitored by infrared (IR) spectroscopy, specifically the disappearance of the absorption peak at 1842 cm$^{-1}$ due to the oxazolinone ring. Once the reaction was complete, the product was collected, and its structure, shown below, was confirmed by $^1$H and $^{13}$C nuclear magnetic resonance (NMR) spectroscopy.

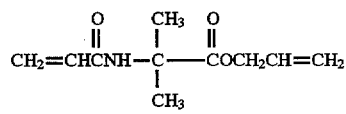

2. Other polyunsaturated compounds derived from AZL

Using the procedure described above for the synthesis of ALAZ, various other polyunsaturated monomers were prepared by reacting AZL with hydroxyl- and amino functional unsaturated compounds. Reactants used in and products derived from these syntheses are summarized below in Table II.

3. Allyl 2-methacryloxyethylcarbamate (ALEM)

Into a 200 ml round bottom flask containing a magnetic stirrer were added 15.5 g 2-isocyanatoethyl methacrylate (hereinafter "IEM", available from PolyScience Corp.; Valley Forge, Pa.), 5.8 g allyl alcohol, and 21.3 g IOA. The stirrer was activated and a drop of dibutyltindilaurate (hereinafter "DBTDL", available from Aldrich) was added.

Progress of the reaction was monitored by IR spectroscopy, specifically the disappearance of the absorption peak at 2270 cm$^{-1}$ due to the isocyanate group. Once the reaction was complete, the product was collected. The structure of this product, shown below, was confirmed by $^1$H and $^{13}$C NMR spectroscopy.

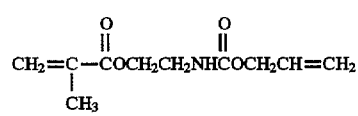

4. Other polyunsaturated compounds derived from IEM

Using the procedure described above for the synthesis of ALEM, various other polyunsaturated monomers were prepared by reacting IEM with hydroxyl- and amino functional unsaturated compounds. The reactants used in and the products derived from these syntheses are listed below in Table III.

TABLE II

Syntheses Based on AZL

| Reactant | Product Formula | Designation |
|---|---|---|
| 2-hydroxyethyl acrylate | CH$_2$=CHCNH—C(CH$_3$)$_2$—COCH$_2$CH$_2$OCCH=CH$_2$ (with C=O groups) | EAAZ |

TABLE II-continued

Syntheses Based on AZL

| Reactant | Product Formula | Designation |
|---|---|---|
| 2-hydroxyethyl methacrylate | $CH_2=CHCNH-C-COCH_2CH_2OCC=CH_2$ with $\|O$, $CH_3$, $\|O$, $\|O$, $CH_3$, $CH_3$ substituents | MAAZ |
| crotyl alcohol | $CH_2=CHCNH-C-COCH_2CH=CHCH_3$ with $\|O$, $CH_3$, $\|O$, $CH_3$ substituents | CRAZ |
| allyl amine | $CH_2=CHCNH-C-CNHCH_2CH=CH_2$ with $\|O$, $CH_3$, $\|O$, $CH_3$ substituents | AMAZ |
| 4-hydroxybutylvinyl ether[1] | $CH_2=CHCNH-C-CO(CH_2)_4OCH=CH_2$ with $\|O$, $CH_3$, $\|O$, $CH_3$ substituents | VEAZ |
| 2-aziridylethanol | $CH_2=CHCNH-C-COCH_2CH_2N(CH_2CH_2)$ (aziridyl ring) with $\|O$, $CH_3$, $\|O$, $CH_3$ substituents | AZAZ[2] |

[1]Available from BASF Corp. (Parsippany, NJ).
[2]AZAZ can be used as a C or D monomer.

TABLE III

Syntheses Based on IEM

| Reactant | Product Formula | Designation |
|---|---|---|
| 2-hydroxyethyl acrylate | $CH_2=CCOCH_2CH_2NHCOCH_2CH_2OCCH=CH_2$ with $\|O$, $\|O$, $\|O$, $CH_3$ substituents | HEEM |
| 2-hydroxyethyl methacrylate | $CH_2=CCOCH_2CH_2NHCOCH_2CH_2OCCC=CH_2$ with $\|O$, $\|O$, $\|O$, $CH_3$, $CH_3$ substituents | EMEM |
| 4-hydroxybutylvinyl ether | $CH_2=CCOCH_2CH_2NH-CO(CH_2)_4OCH=CH_2$ with $\|O$, $\|O$, $CH_3$ substituents | VEEM |
| aziridylethanol | $(CH_2CH_2)NCH_2CH_2OCNHCH_2CH_2OCC=CH_2$ with aziridyl ring, $\|O$, $\|O$, $CH_3$ substituents | AZEM[1] |

[1]AZEM can be used as a C or D monomer.

Pressure Sensitive Adhesives

Three different types of coatable compositions were prepared. These were designated as Type I, Type II, and Type III.

Type I compositions were prepared by reacting pendent acid groups of a solute polymer with D monomers such as AZEM, AZAZ, VEEM, VEAZ, 2-isopropenyl-2-oxazoline (hereinafter "IPOX", available from Dow Chemical Co.; Midland, Mich.), and glycidyl acrylate (hereinafter "GA", available from Aldrich) to produce a myriad of pendent unsaturated units.

Type II compositions were prepared by reacting pendent hydroxyl groups of a solute polymer with D monomers such as IEM, methacryloyl-isocyanate (hereinafter "MIS", available from Nippon Paints; Osaka, Japan), AZL, acryloyl chloride (hereinafter "ACL", available from Aldrich), and 2-(acetoacetoxy)ethyl methacrylate (hereinafter "AcAc", available from Aldrich).

Type III compositions were prepared by incorporating into the solute polymer mer units derived from polyunsaturated compounds (PUCs).

1. Type I compositions

A master batch of a coatable composition (designated "syrup #1") was prepared by (1) mixing, under a nitrogen atmosphere, 90 pbw IOA, 10 pbw acrylic acid (hereinafter "AA"), and 0.04 pbw Irgacure™ 651 photoinitiator; (2) exposing this mixture to UV radiation until its viscosity reached 3000 cP; and (3) adding an additional 0.12 pbw photoinitiator.

Portions of syrup #1 were reacted with a number of D monomers to create various solute polymers, as described below.

a. Reaction with AZEM

To a series of 100 pbw aliquots of syrup #1 were added 0.06, 0.15, and 0.31 pbw portions of AZEM. (For comparative examples C1 to C3, 0.06, 0.15, and 0.31 (respectively) pbw of the reaction product of AZEM with AA was added to 100 pbw of syrup #1.) Each mixture was knife-coated at a thickness of 50 µm onto a 40 µm-thick poly(ethylene terephthalate), hereinafter "PET", film.

In a nitrogen-rich chamber, the coated samples were exposed to UV radiation until each had received 250 mJ/cm$^2$ of energy at an average intensity of 2.2 mW/cm$^2$ (as measured by a low-intensity UVIMAP™ UM 365 L-S radiometer (Electronic Instrumentation & Technology, Inc.; Sterling, Va.), having a spectral response in the range of 300 to 400 nm and a maximum response at 358 nm).

Specific chamber conditions and test results for each of these samples are compiled below in Table IV.

TABLE IV

| Example No. | Amt. of AZEM (pbw) | Amt. of O$_2$ in chamber (ppm) | 180° Peel (N/dm) | Shear Strength (min) Room Temp.[1] | 70° C.[2] |
|---|---|---|---|---|---|
| C1 | 0.06 | 200 | 68 | 4500 | 300 |
| C2 | 0.15 | 200 | 72 | 6800 | 450 |
| C3 | 0.31 | 190 | 68 | 10,000+ | 660 |
| 1 | 0.06 | 100 | 72 | 10,000+ | 10,000+ |
| 2 | 0.15 | 100 | 62 | 10,000+ | 10,000+ |
| 3 | 0.31 | 100 | 62 | 10,000+ | 10,000+ |
| 4 | 0.15 | 300 | 99 | 10,000+ | 10,000+ |
| 5 | 0.15 | 400 | 97 | 10,000+ | 10,000+ |

TABLE IV-continued

| Example No. | Amt. of AZEM (pbw) | Amt. of O$_2$ in chamber (ppm) | 180° Peel (N/dm) | Shear Strength (min) Room Temp.[1] | 70° C.[2] |
|---|---|---|---|---|---|
| 6 | 0.15 | 500 | 90 | 10,000+ | 10,000+ |
| 7 | 0.15 | 600 | 99 | 10,000+ | 10,000+ |

[1] 12.7 mm × 12.7 mm overlap area with a 1 kg load.
[2] 25.4 mm × 12.7 mm overlap area with a 500 g load.

The data of Table IV clearly demonstrate that PSAs with high shear strengths at both ambient and elevated temperatures can be made from coatable compositions without sacrificing good peel adhesion and that addition of AZEM to a coatable monomer-polymer acrylic composition, rather than the addition of the reaction product of AZEM and AA to a similar composition, produces a PSA with superior shear strength.

b. Reaction with AZAZ

To a series of 100 pbw aliquots of syrup #1 were added 0.06, 0.15, and 0.31 pbw portions of AZAZ. (For comparative examples C4 to C6, 0.09, 0.19, and 0.28 (respectively) pbw of the reaction product of AZAZ with AA was added to pbw of syrup #1.) Each mixture was knife-coated at a thickness of 50 µm onto a 40 µm-thick PET film.

In a nitrogen-rich chamber, the coated samples were exposed to UV radiation until each had received 250 mJ/cm$^2$ of energy at an average intensity of 2.2 mW/cm$^2$ (as measured by a UVIMAP™ radiometer).

Specific chamber conditions and test results for each of these samples are compiled below in Table V.

TABLE V

| Example No. | Amt. of AZAZ (pbw) | Amt. of O$_2$ in chamber (ppm) | Shear Strength (min) Room Temp.[1] | 70° C.[2] |
|---|---|---|---|---|
| C4 | 0.09 | 200 | 3800 | 300 |
| C5 | 0.19 | 200 | 4200 | 370 |
| C6 | 0.28 | 200 | 3400 | 420 |
| 8 | 0.08 | 200 | 10,000+ | 10,000+ |
| 9 | 0.19 | 200 | 10,000+ | 10,000+ |
| 10 | 0.28 | 200 | 10,000+ | 10,000+ |
| 11 | 0.28 | 300 | 10,000+ | 10,000+ |

[1] 12.7 mm × 12.7 mm overlap area with a 1 kg load.
[2] 25.4 mm × 12.7 mm overlap area with a 500 g load.

The data of Table V show that PSAs prepared from coatable compositions comprising a solute polymer with pendent unsaturation have shear properties which exceed those of PSAs derived from a syrup that merely includes the reaction product of AZAZ and AA.

c. Reaction with VEAZ or VEEM

To a series of 100 pbw aliquots of syrup #1 were added 0.1 and 0.3 pbw portions of VEAZ or VEEM. Each mixture was knife-coated at a thickness of 175 µm onto a 50 mm-thick, silicone-coated release paper.

In a nitrogen-rich chamber (i.e., about 180 ppm oxygen), the coated samples were exposed to UV radiation until each had received 300 mJ/cm$^2$ of energy at an average intensity of 1.6 mW/cm$^2$ (as measured by a UVIRAD™ VR 365CH3 radiometer, available from Electronic Instrumentation & Technology, Inc.).

Test results for each &these samples are compiled below in Table VI.

TABLE VI

| Example No. | D monomer Type | D monomer pbw | 72 hour 90° Peel Adhesion[1] (N/dm) Stainless steel | 72 hour 90° Peel Adhesion[1] (N/dm) Polypropylene | Shear Strength[1] (min) Room Temp.[2] | Shear Strength[1] (min) 70° C.[3] |
|---|---|---|---|---|---|---|
| 12 | VEEM | 0.1 | 86 | 31 | 10,000+ | 1000 |
| 13 | VEEM | 0.3 | 70 | 26 | 10,000+ | 1800 |
| 14 | VEAZ | 0.1 | 84 | 31 | 9000 | 300 |
| 15 | VEAZ | 0.3 | 75 | 29 | 10,000+ | 10,000+ |

[1]Tests performed on 50 μm aluminum foil backings.
[2]25.4 mm × 12.7 mm overlap area with a 1 kg load.
[3]25.4 mm × 12.7 mm overlap area with a 500 g load.

The data of Table VI also show that coatable compositions containing a solute polymer with pendent ethylenic unsaturation can be cured to provide high performance PSAs.

d. Reaction with IPOX

To a series of 100 pbw aliquots of syrup #1 were added 0.05 and 0.2 pbw portions of IPOX. (For comparative example C7, 0.05 pbw of the reaction product of IPOX with AA was added to 100 pbw of syrup #1.) Each mixture was knife-coated at a thickness of 50 μm onto a 40 μm-thick PET film.

In a nitrogen-rich chamber, the coated samples were exposed to UV radiation until each had received 250 mJ/cm$^2$ of energy at an average intensity of 2.2 mW/cm$^2$ (as measured by a UVIMAP™ radiometer).

Specific chamber conditions and test results for each of these samples are compiled below in Table VII.

TABLE VII

| Example No. | Amt. of IPOX (pbw) | Amt. of O$_2$ in chamber (ppm) | 180° Peel (N/dm) | Shear Strength (min) Room Temp.[1] | Shear Strength (min) 70° C.[2] |
|---|---|---|---|---|---|
| C7 | 0.05 | 200 | 68 | 4500 | 300 |
| 16 | 0.05 | 100 | — | 10,000+ | 1000 |
| 17 | 0.2 | 100 | — | 10,000+ | 10,000+ |

[1]12.7 mm × 12.7 mm overlap area with a 1 kg load.
[2]25.4 mm × 12.7 mm overlap area with a 500 g load.

The data of Table VII show that coatable monomer-polymer acrylic compositions containing relatively small amounts of IPOX can be radiation cured to produce PSAs with excellent shear properties.

e. Reaction with GA

To three 100 pbw aliquots of syrup #1 were added, respectively, 0.02, 0.04, and 0.06 pbw portions of GA. Each mixture was knife-coated at a thickness of 125 μm onto a 50 μm-thick, silicone-coated release paper.

In a nitrogen-rich chamber (i.e., about 190 ppm oxygen), the coated samples were exposed to UV radiation for 145 seconds, one-third of the time at an intensity of 1.0 mW/cm$^2$ and the remaining two-thirds at an intensity of 2.2 mW/cm$^2$ (as measured by a UVIMAP™ radiometer).

Each sample was evaluated for shear strength. A portion of each sample was heated at 150° C. for about three hours to hasten complete cure. Test results for each sample are compiled below in Table VIII.

TABLE VIII

| Example No. | Amt. of GA (pbw) | Shear Strength (min) No post cure Room Temp. | Shear Strength (min) No post cure 70° C. | Shear Strength (min) 3 hours at 150° C. Room Temp. | Shear Strength (min) 3 hours at 150° C. 70° C. |
|---|---|---|---|---|---|
| 18 | 0.06 | 6810 | 160 | 10,000+ | 10,000+ |
| 19 | 0.04 | 7000 | 160 | 10,000+ | 10,000+ |
| 20 | 0.02 | 7380 | 136 | 10,000+ | 10,000+ |

The data of Table VIII show that coatable compositions containing relatively small amounts of GA that are heated for only three hours can result in PSAs with shear strengths of at least 10,000 minutes.

2. Type II compositions
a. Reaction with IEM

Two coatable compositions were prepared by (1) mixing, under a nitrogen atmosphere, 90 pbw IOA, 10 pbw AA, 0.04 pbw 2,2-dimethoxy-2-phenyl acetophenone, and 0.025 or 0.1 pbw 2-hydroxyethyl acrylate (hereinafter "HEA"); (2) exposing each mixture to UV radiation until its viscosity reached about 3000 cP; and (3) adding an additional 0.12 pbw Irgacure™ 651 photoinitiator. To the composition containing 0.1 pbw HEA was added 0.133 pbw IEM and a catalytic amount of DBTDL. (This mixture is designated as Example No. 21 below.) To the composition containing 0.025 pbw HEA was added 0.03 pbw IEM and a catalytic amount of DBTDL. (This mixture is designated as Example No. 22 below.)

Each mixture was knife-coated at a thickness of 125 μm onto a 50 μm-thick, silicone-coated release paper. In a nitrogen-rich chamber (i.e., about 190 ppm oxygen), each of these coated samples was exposed to UV radiation for 145 seconds, one-third of the time at an intensity of 1.0 mW/cm$^2$ and the remaining two-thirds at an intensity of 2.2 mW/cm$^2$ (as measured by a UVIMAP™ VR 365CH3 radiometer).

Each sample was evaluated for peel adhesion and shear strength. Test results for each sample are compiled below in Table IX.

TABLE IX

| Example No. | Amt. of HEA (pbw) | 72 hour 90° Peel Adhesion[1] (N/dm) | Shear Strength (min) Room Temp.[2] | Shear Strength (min) 70° C.[3] |
|---|---|---|---|---|
| 21 | 0.100 | 200 | 10,000+ | 10,000+ |
| 22 | 0.025 | 220 | 10,000+ | 10,000+ |

[1]Tests performed on stainless steel.
[2]12.7 mm × 12.7 mm overlap area with a 1 kg load.
[3]25.4 mm × 12.7 mm overlap area with a 500 g load.

The data of Table IX demonstrate that coatable compositions that comprise a solute polymer with pendent acrylic groups can be cured to provide PSAs with shear values of at least 10,000 minutes, even when the compositions contain as little as 0.025 pbw of a functional group-containing monomer. The hydroxyl group (as is present in the monomers used in Examples 21–22) is reactive with a variety of isocyanate group-containing monomers to provide solute polymers with a myriad of pendent unsaturated groups.

b. Reaction with MIS

Three coatable compositions were prepared by (1) mixing, under a nitrogen atmosphere, 90 pbw IOA, 10 pbw AA, 0.025, 0.10, or 0.20 pbw HEA, and 0.04 pbw Irgacure™ 651 photoinitiator; (2) exposing each mixture to UV radiation until its viscosity reached about 3000 cP; and (3)

adding an additional 0.12 pbw 2,2-dimethoxy-2-phenyl acetophenone. To the composition containing 0.20 pbw HEA was added 0.18 pbw MIS. (This mixture is designated as Example No. 23 below.) To the composition containing 0.10 pbw HEA was added 0.09 pbw MIS. (This mixture is designated as Example No. 24 below.) To the composition containing 0.025 pbw HEA was added 0.02 pbw MIS. (This mixture is designated as Example No. 25 below.)

Each mixture was knife-coated at a thickness of 125 μm onto a 50 μm-thick, silicone-coated release paper. In a nitrogen-rich chamber (i.e., about 250 ppm oxygen), the coated samples were exposed to UV radiation for 145 seconds, one-third of the time at an intensity of 1.0 mW/cm$^2$ and the remaining two-thirds at an intensity of 2.2 mW/cm$^2$ (as measured by a UVIMAP™ radiometer).

Each sample was evaluated for peel adhesion and shear strength. Test results for each sample are compiled below in Table X.

TABLE X

| Example No. | Amt. of HEA (pbw) | 72 hour 90° Peel Adhesion[1] (N/dm) | Shear Strength (min) | |
|---|---|---|---|---|
| | | | Room Temp.[2] | 70° C.[3] |
| 23 | 0.20 | 210 | 10,000+ | 10,000+ |
| 24 | 0.10 | 210 | 10,000+ | 1100 |
| 25 | 0.025 | 205 | 10,000+ | 20 |

[1]Tests performed on stainless steel.
[2]12.7 mm × 12.7 mm overlap area with a 1 kg load.
[3]25.4 mm × 12.7 mm overlap area with a 500 g load.

The data of Table X show that coatable compositions that comprise a solute polymer that is the reaction product of MIS and HEA, even in the absence of catalyst, can be cured to provide PSAs with shear values of at least 10,000 minutes.

c. Reaction with AZL and ACL

Three coatable compositions were prepared by (1) mixing, under a nitrogen atmosphere, 90 pbw IOA, 10 pbw AA, 0.10, 0.025, or 0.10 pbw HEA, and 0.04 pbw Irgacure™ 651 photoinitiator; (2) exposing each mixture to UV radiation until its viscosity reached about 3000 cP; and (3) adding an additional 0.12 pbw photoinitiator. To the composition containing 0.025 pbw HEA was added 0.03 pbw AZL and a catalytic amount of DBU. (This mixture is designated as Example No. 26 below.) To the first composition containing 0.10 pbw HEA was added 0.12 pbw AZL and a catalytic amount of DBU. (This mixture is designated as Example No. 27 below.) To the second composition containing 0.10 pbw HEA was added 0.08 pbw ACL. (This mixture is designated as Example No. 28 below.)

Each mixture was knife-coated at a thickness of 125 μm onto a 50 μm-thick, silicone-coated release paper. In a nitrogen-rich chamber (i.e., about 250 ppm oxygen), the coated samples were exposed to UV radiation for 145 seconds, one-third of the time at an intensity of 1.0 mW/era$^2$ and the remaining two-thirds at an intensity of 2.2 mW/cm$^2$ (as measured by a UVIMAP™ radiometer).

Each sample was evaluated for peel adhesion and shear strength. Test results for each sample are compiled below in Table XI.

TABLE XI

| Example No. | 72 hour 90° Peel Adhesion[1] (N/dm) | Shear Strength (min) | |
|---|---|---|---|
| | | Room Temp.[2] | 70° C.[3] |
| 26 | 225 | 10,000+ | 10,000+ |
| 27 | 215 | 10,000+ | 10,000+ |
| 28 | 208 | 10,000+ | 10,000+ |

[1]Tests performed on stainless steel
[2]12.7 mm × 12.7 mm overlap area with a 1 kg load.
[3]25.4 mm × 12.7 mm overlap area with a 500 g load.

The data of Table XI show that coatable compositions that comprise a solute polymer with pendent ethylenic unsaturation derived from a hydroxyl group-containing monomer, even as little of 0.025 pbw of such a monomer, and a coreactive azlactyl or acryloyl group-containing monomer can be cured to provide PSAs with shear values of at least 10,000 minutes.

d. Reaction with AcAc and IEM

Three coatable compositions were prepared by (1) mixing, under a nitrogen atmosphere, 90 pbw IOA, 10 pbw AA, 0.10, 0.20, and 0.30 pbw AcAc, and 0.04 pbw Irgacure™ 651 photoinitiator; (2) exposing each mixture to UV radiation until its viscosity reached about 3000 cP; and (3) adding an additional 0.12 pbw photoinitiator.

To the composition containing 0.10 pbw AcAc was added 0.07 pbw IEM and a catalytic amount of DBTDL. (This mixture is designated as Example No. 29 below.) To the composition containing 0.20 pbw AcAc was added 0.13 pbw IEM and a catalytic amount of DBTDL. (This mixture is designated as Example No. 30 below.) To the composition containing 0.30 pbw AcAc was added 0.20 pbw IEM and a catalytic amount of DBTDL. (This mixture is designated as Example No. 31 below.)

Each mixture was knife-coated at a thickness of 125 μm onto a 50 μm-thick, silicone-coated release paper. In a nitrogen-rich chamber (i.e., about 250 ppm oxygen), the coated samples were exposed to UV radiation for 145 seconds, one-third of the time at an intensity of 1.0 mW/cm$^2$ and the remaining two-thirds at an intensity of 2.2 mW/cm$^2$ (as measured by a UVIMAP™ radiometer).

Each sample was evaluated for peel adhesion and shear strength. Test results for each sample are compiled below in Table XII.

TABLE XII

| Example No. | 72 hour 90° Peel Adhesion[1] (N/dm) | Shear Strength (min) | |
|---|---|---|---|
| | | Room Temp.[2] | 70° C.[3] |
| 29 | 220 | 10,000+ | 340 |
| 30 | 205 | 10,000+ | 2200 |
| 31 | 230 | 10,000+ | 10,000+ |

[1]Tests performed on stainless steel.
[2]12.7 mm × 12.7 mm overlap area with a 1 kg load.
[3]25.4 mm × 12.7 mm overlap area with a 500 g load.

The data of Table XII show that, to provide a PSA with a shear strength of at least 10,000 minutes at 70° C., as little as 0.3 pbw AcAc can be present in the coatable composition.

3. Type III compositions a. HDDA

A master batch (hereinafter "syrup #2") of the following monomers was prepared: 90 pbw IOA, 10 pbw AA, and 0.04 pbw IrgacureÓ 651 photoinitiator.

A series of samples containing 100 pbw of syrup #2 and from 0 to 0.100 pbw HDDA were prepared. The samples were purged with nitrogen and exposed, in bulk, to UV radiation until each reached a viscosity of about 3000 cP. To each coatable composition was added 0.100 to 0 pbw HDDA, so that the total amount of HDDA added to each sample was 0.100 pbw.

Each mixture was knife-coated at a thickness of 125 μm onto a 50 μm-thick, silicone-coated release paper. In a nitrogen-rich chamber (i.e., about 190 ppm oxygen), each &these coated samples was exposed to UV radiation for 145 seconds, one-third of the time at an intensity of 1.0 mW/cm$^2$ and the remaining two-thirds at an intensity of 2.2 mW/cm$^2$ (as measured by a UVIMAP™ radiometer).

Each sample was evaluated for peel adhesion and shear strength. Test results for each sample are compiled below in Table XII.

TABLE XIII

| Example No. | Amt. of HDDA (pbw) | | Peel Adhesions 72 hour 90° (N/dm) | Shear Strength (min) | |
|---|---|---|---|---|---|
| | Before syrup prep. | After syrup prep. | | Room Temp. | 70° C. |
| C8 | 0.000 | 0.100 | 230 | 10,000+ | 180 |
| 32 | 0.001 | 0.099 | 210 | 8396 | 175 |
| 33 | 0.005 | 0.095 | 210 | 10,000+ | 410 |
| 34 | 0.010 | 0.090 | 210 | 10,000+ | 470 |
| 35 | 0.050 | 0.050 | 190 | 10,000+ | 2400 |
| 36 | 0.060 | 0.040 | 220 | 10,000+ | 10,000+ |
| 37 | 0.100 | 0.000 | 240 | 10,000+ | 10,000+ |

[1]Tests performed on stainless steel.
[2]12.7 mm × 12.7 mm overlap area with a 1 kg load.
[3]25.4 mm × 12.7 mm overlap area with a 500 g load.

The data of Table XIII show that PSAs prepared from compositions originally containing 0.060 or more pbw HDDA (i.e., examples 36 and 37) exhibit shear strengths of at least 10,000 minutes at room temperature and 70° C. Compositions containing less than 0.01 pbw HDDA can be used to make PSAs, but the concentration of units comprising pendent ethylenic unsaturation is too small to obtain good shear strength at elevated temperatures. All of the compositions exhibit better properties than the comparative example where HDDA was added to the composition after it had been polymerized to a coatable viscosity.

b. Other PUCs

A number of samples containing 100 pbw of syrup #2 and from 0 to 1.0 pbw of various PUCs were prepared. These samples were purged with nitrogen and exposed to UV radiation (as described in the previous examples) until they reached a coatable viscosity. To each composition was added the desired concentration of a PUC. Each composition was then coated onto silicone-coated release paper (as described in the previous examples).

These samples, along with several comparative examples, were tested to determine their peel and shear properties. The results of these tests are compiled below in Table XIV.

TABLE XIV

| Exam- ple No. | Identity of PUC | Amt. of PUC (pbw) | | Shear Strength (min) | |
|---|---|---|---|---|---|
| | | Before syrup prep. | After syrup prep. | Room Temp.[1] | 70° C.[2] |
| C9 | 3 | 0 | 0.1 | 5530 | 60 |
| 38 | 3 | 0.05 | 0.05 | 10,000+ | 10,000+ |
| 39 | 3 | 0.1 | 0 | 10,000+ | 10,000+ |

TABLE XIV-continued

| Exam- ple No. | Identity of PUC | Amt. of PUC (pbw) | | Shear Strength (min) | |
|---|---|---|---|---|---|
| | | Before syrup prep. | After syrup prep. | Room Temp.[1] | 70° C.[2] |
| C10 | 4 | 0 | 0.1 | 6800 | 178 |
| 40 | 4 | 0.08 | 0.02 | 10,000+ | 2100 |
| 41 | 4 | 0.08 | 0.08 | 10,000+ | 10,000+ |
| C11 | 5 | 0 | 0.1 | 7200 | 470 |
| 42 | 5 | 0.05 | 0.05 | 10,000+ | 10,000+ |
| 43 | 5 | 0.1 | 0 | 10,000+ | 10,000+ |
| C12 | 6 | 0 | 0.1 | 4500 | 380 |
| 44 | 6 | 0.05 | 0.05 | 10,000+ | 2100 |
| 45 | 6 | 0.1 | 0 | 10,000+ | 10,000+ |
| C13 | 7 | 0 | 0.1 | 950 | 10 |
| 46 | 7 | 0 | 0.5 | 2140 | 85 |
| 47 | 7 | 0.5 | 0.5 | 8500 | 470 |
| C14 | 8 | 0 | 0.1 | 270 | 82 |
| 48 | 8 | 0.1 | 0 | 370 | 85 |
| 49 | 8 | 0.3 | 0 | 1965 | 574 |
| 50 | 8 | 0.3 | 0[11] | 10,000+ | 10,000+ |
| 51 | 8 | 0.5 | 0 | 10,000+ | 10,000+ |
| C15 | 9 | 0 | 0.1 | 470 | 38 |
| 52 | 9 | 0.1 | 0 | 253 | 82 |
| 53 | 9 | 0.3 | 0 | 1657 | 658 |
| 54 | 9 | 0.3 | 0[11] | 10,000+ | 10,000+ |
| 55 | 9 | 0.5 | 0 | 10,000+ | 10,000+ |
| 56 | 9 | 1.0 | 0 | 10,000+ | 10,000+ |
| C16 | 10 | 0 | 0.1 | 10,000+ | 1050 |
| 57 | 10 | 0.05 | 0.05 | 10,000+ | 10,000+ |

[1]25.4 mm × 25.4 mm overlap area with a 1 kg load.
[2]25.4 mm × 12.7 mm overlap area with a 500 g load.
[3]HEEM (see Table III). All testes performed on this series were done on 25.4 mm × 12.7 mm overlap areas with a 1 kg load.
[4]EMEM (see Table III).
[5]EAAZ (see Table II).
[6]MAAZ (see Table II).
[7]CRAZ (see Table II).
[8]AMAZ (see Table II).
[9]Allyl acrylate (Aldrich).
[10]Propargyl acrylate.
[11]0.1 pbw HDDA also added to sample.

The data of Table XIV clearly show that, where a PUC is added only after a composition has been cured to a coatable viscosity (i.e., the initial concentration of PUC is zero), the resulting PSA has poor shear strength. On the other hand, PSAs made from compositions that initially contain at least some PUC have excellent shear properties. This is true for all PUCs except CRAZ, but even the CRAZ examples are better than the comparative examples where no PUC was added until after a coatable viscosity had been attained.

The data of Table XIV also show that the high temperature shear performance of the adhesive depends on the reactivity of the PUC used. Greater amounts of less reactive PUCs, such as AMAZ and allyl acrylate, must be added to compositions to obtain adhesives with high temperature shear performance. The least reactive PUCs (i.e., CRAZ and CRAC) did not show improvement in high temperature shear regardless of the concentration of PUC used. These PUCs produce 1,2-disubstituted pendent unsaturation that is difficult to activate. Accordingly, poor crosslinking density is obtained.

Example 58

In a glass polymerization bottle were charged 90 g IOA, 10 g AA, 100 g ethyl acetate, 0.5 g dibenzoyl peroxide, and 0.04 g carbon tetrabromide. The bottle was purged with $N_2$, sealed, and tumbled in a water bath maintained at 60° C. for 12 hours to produce a IOA/AA copolymer. To this solution was added 0.75 g AZEM (prepared as described above) and 0.2 g Irgacure™ 651 initiator, and the mixture was maintained at ambient temperature overnight.

The functionalized polymer was hot-melt coated onto a polyester film at approximately 150° C. after removal of the solvent to provide a 125 μm thick coating of adhesive. The tape was cured to a high performance adhesive by irradiating with a low intensity dose of about 600 mJ/cm™.

Example 59

In a glass polymerization bottle were charged 80 g IOA, 18 g isobornyl acrylate, 2 g AA, 0.5 g dibenzoyl acrylate, and 0.04 g carbon tetrabromide. The bottle was purged with $N_2$, sealed, and tumbled in a water bath maintained at 60° C. for 12 hours to produce a IOA/IBA/AA terpolymer. To this polymer solution was added 0.75 g AZEM (prepared as described above) and 0.2 g Irgacure™ 651 initiator, and the mixture was maintained at ambient temperature overnight.

The functionalized polymer was hot-melt coated onto a polyester film at approximately 150° C. after removal of the solvent to provide a 125 μm thick coating of adhesive. The tape was cured to a high performance adhesive by irradiating with a low intensity dose of about 600 mJ/cm$^2$.

Various modifications and alterations that do not depart from the scope and spirit of this invention will become apparent to those skilled in the art. This invention is not to be unduly limited to the illustrative embodiments set forth herein.

We claim:

1. A process for making a substrate bearing a coating of a crosslinked pressure sensitive adhesive on at least one surface thereof, comprising the steps:
   a) coating onto said substrate a mixture comprising
      1) a pressure sensitive adhesive polymer comprising a plurality of mer units comprising pendent polymerizable unsaturation,
      2) at least one free radically polymerizable unsaturated monomer,
      3) an effective initiating amount of an energy activated initiator of polymerization; and
      4) optionally, at least one of a tackifier, a plasticizer, a polymerization inhibitor, and a chain transfer agent; and
   b) subjecting said coated mixture to energy that activates said initiator so as to crosslink said polymer and form said crosslinked pressure sensitive adhesive.

2. The process of claim 1 wherein said polymer comprises mer units derived from a monoethylenically unsaturated monomer that is homopolymerizable to a polymer having a glass transition temperature less than about 0° C. and, optionally, further comprises mer units derived from a second monoethylenically unsaturated monomer, said second monoethylenically unsaturated monomer being homopolymerizable to a polymer having a glass transition temperature greater than about 50° C.

3. The process of claim 1 wherein said mer units comprising pendent polymerizable unsaturation are present in amount of from about 0.001 to about 5 weight percent, per 100 weight percent of said polymer.

4. The process of claim 3 wherein said mer units comprising pendent polymerizable unsaturation are present in an amount of from about 0.01 to about 3 weight percent, per 100 weight percent of said polymer.

5. The process of claim 1 wherein said pressure sensitive adhesive polymer comprising a plurality of mer units comprising pendent polymerizable unsaturation is the reaction product of
   a) a pressure sensitive adhesive polymer comprising a plurality of mer units that comprise a pendent functional group and
   b) a free radically polymerizable unsaturated monomer comprising a functional group that is coreactive with said pendent functional group.

6. The process of claim 5 wherein said pendent functional group is selected from the class consisting of hydroxyl, amino, azlactyl, oxazolinyl, acetoacetyl, carboxyl, isocyanate, epoxy, aziridinyl, acyl halide, vinyloxy, and cyclic anhydride groups.

7. The process of claim 6 wherein said coreactive functional group is selected from the class consisting of hydroxyl, amino, azlactyl, oxazolinyl, acetoacetyl, carboxyl, isocyanate, epoxy, aziridinyl, acyl halide, vinyloxy, and cyclic anhydride groups.

8. The process of claim 5 wherein said energy activated initiator of polymerization is added to said mixture after said pressure sensitive adhesive polymer comprising a plurality of mer units that comprise a pendent functional group and said free radically polymerizable unsaturated monomer comprising a coreactive functional group have reacted to form said pressure sensitive adhesive polymer comprising a plurality of mer units comprising pendent polymerizable unsaturation.

9. The process of claim 1 wherein said energy activated initiator of polymerization is a photoinitiator.

10. The process of claim 9 wherein said photoinitiator has an absorbance maximum of about 280 nm or greater.

11. The process of claim 9 wherein said photoinitiator is present in an amount of from about 0.01 to about 5 parts by weight, per 100 parts by weight of said pressure sensitive adhesive polymer.

12. The process of claim 1 wherein said unsaturated monomer is present in an amount of from about 200 to about 10,000 parts by weight, per 100 parts by weight of said polymer.

13. The process of claim 12 wherein said mer units comprising pendent polymerizable unsaturation are present in amount of from about 0.001 to about 5 weight percent, per 100 weight percent of said polymer.

14. The process of claim 13 wherein said mer units comprising pendent polymerizable unsaturation are present in an amount of about 0.01 to about 3 weight percent, per 100 weight percent of said polymer.

15. The process of claim 12 wherein said pressure sensitive adhesive polymer comprising a plurality of mer units comprising pendent polymerizable unsaturation is the reaction product of
   a) a pressure sensitive adhesive polymer comprising a plurality of mer units that comprise a pendent functional group and
   b) a free radically polymerizable unsaturated monomer comprising a functional group that is coreactive with said pendent functional group.

16. The process of claim 15 wherein said pendent functional group is selected from the class consisting of hydroxyl, amine, azlactyl, oxazolinyl, acetoacetyl, carboxyl, isocyanate, epoxy, aziridinyl, acyl halide, vinyloxy, and cyclic anhydride groups.

17. The process of claim 16 wherein said coreactive functional group is selected from the class consisting of hydroxyl, amino, azlactyl, oxazolinyl, acetoacetyl, carboxyl, isocyanate, epoxy, aziridinyl, acyl halide, vinyloxy, and cyclic anhydride groups.

18. The process of claim 12 wherein said at least one monomer comprises a monoethylenically unsaturated monomer that is homopolymerizable to a polymer having a glass transition temperature less than about 0° C. and, optionally, further comprises a second monoethylenically unsaturated monomer, said second monoethylenically unsaturated monomer being homopolymerizable to a polymer having a glass transition temperature greater than about 50° C.

19. The process of claim 12 wherein said at least one monomer comprises a polyunsaturated monomer.

20. The process of claim 12 wherein said polymer comprising a plurality of mer units comprising pendent polymerizable unsaturation comprises
 a) 50 to 100 weight percent mer units derived from a monoethylenically unsaturated monomer that is homopolymerizable to a polymer having a glass transition temperature less than about 0° C.;
 b) 0 to 50 weight percent mer units derived from a second monoethylenically unsaturated monomer, said second monoethylenically unsaturated monomer being homopolymerizable to a polymer having a glass transition temperature greater than about 50° C.; and
 c) 0 to about 3 weight percent mer units derived from
  1) a polyunsaturated monomer, or
  2) an unsaturated monomer comprising a functional group, said functional group having been reacted with an ethylenically unsaturated monomer comprising a second functional group, said second functional group being coreactive with said first functional group,
with the proviso that, where neither (a) or, when present, (b) comprise a pendent functional group capable of further reaction, the amount of (c) cannot be zero.

21. A composition comprising:
 a) a solute pressure sensitive polymer comprising a plurality of mer units comprising pendent polymerizable unsaturation,
 b) at least one free radically-polymerizable unsaturated solvent monomer, and
 c) an energy activated initiator of free radical polymerization, said composition being of a coatable viscosity under ambient conditions and being curable to a crosslinked pressure sensitive adhesive.

22. The composition of claim 21 wherein said at least one monomer comprises a monoethylenically unsaturated monomer that is homopolymerizable to a polymer having a glass transition temperature less than about 0° C. and, optionally, further comprises a second monoethylenically unsaturated monomer, said second monoethylenically unsaturated monomer being homopolymerizable to a polymer having a glass transition temperature greater than about 50° C.

23. The composition of claim 21 wherein said polymer comprising a plurality of mer units comprising pendent polymerizable unsaturation is the reaction product of
 a) a polymer comprising a plurality of mer units that comprise a pendent functional group, and
 b) an unsaturated monomer comprising a second functional group, said second functional group being coreactive with said first functional group.

24. The composition of claim 23 wherein said first functional group is selected from the class consisting of hydroxyl, amino, azlactyl, oxazolinyl, acetoacetyl, carboxyl, isocyanate, epoxy, aziridinyl, acyl halide, vinyloxy, and cyclic anhydride groups.

25. The composition of claim 21 wherein said polymer comprising a plurality of mer units comprising pendent polymerizable unsaturation is the reaction product of a portion of said at least one solvent monomer.

26. The composition of claim 25 wherein said at least one solvent monomer comprises:
 a) 50 to 100 parts by weight of a monoethylenically unsaturated monomer that is homopolymerizable to a polymer having a glass transition temperature less than about 0° C.;
 b) 0 to 50 parts by weight of a second monoethylenically unsaturated monomer, said second monoethylenically unsaturated monomer being homopolymerizable to a polymer having a glass transition temperature greater than about 50° C.; and
 c) per 100 parts by weight of said first and second monoethylenically unsaturated monomers, 0 to about 3 parts by weight of an unsaturated monomer comprising a pendent functional group capable of further reaction.
with the proviso that, where neither (a) or, when present, (b) comprises a pendent functional group capable of further reaction, the amount of (c) cannot be zero.

27. The composition of claim 21 wherein said polymer comprising a plurality of mer units comprising pendent polymerizable unsaturation comprises
 a) 50 to 100 weight percent mer units derived from a monoethylenically unsaturated monomer that is homopolymerizable to a polymer having a glass transition temperature less than about 0° C.;
 b) 0 to 50 weight percent mer units derived from a second monoethylenically unsaturated monomer, said second monoethylenically unsaturated monomer being homopolymerizable to a polymer having a glass transition temperature greater than about 50° C.; and
 c) 0 to about 3 weight percent mer units derived from
  1) a polyunsaturated monomer, or
  2) an unsaturated monomer comprising a functional group, said functional group having been reacted with an unsaturated monomer comprising a second functional group, said second functional group being coreactive with said first functional group,
with the proviso that, where neither (a) or, when present, (b) comprise a pendent functional group capable or further reaction, the amount of (c) cannot be zero.

28. A polyfunctional monomer having the general formula $$CH_2=C(R)-CX-Y-CO-BZ$$
$$\phantom{CH_2=C}\overset{\|}{O}\phantom{-CX-Y-}\overset{\|}{O}$$

wherein
R is hydrogen or a methyl group,
X is O or NH,
Y is

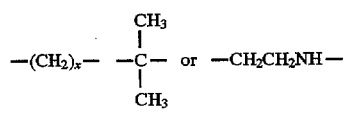

where x is an integer from 1 to 4,
B is $$-(CH_2)_xE$$

in which x is defined as before and E is a single bond, O, or OC(O), and
Z is

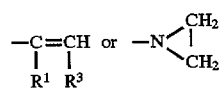

in which $R^1$ and $R^3$ are independently hydrogen or a methyl group.

* * * * *